No. 707,965. Patented Aug. 26, 1902.
M. B. GOOING.
COMBINED ROAD CART AND INSECT CATCHER.
(Application filed Mar. 3, 1902.)
(No Model.)
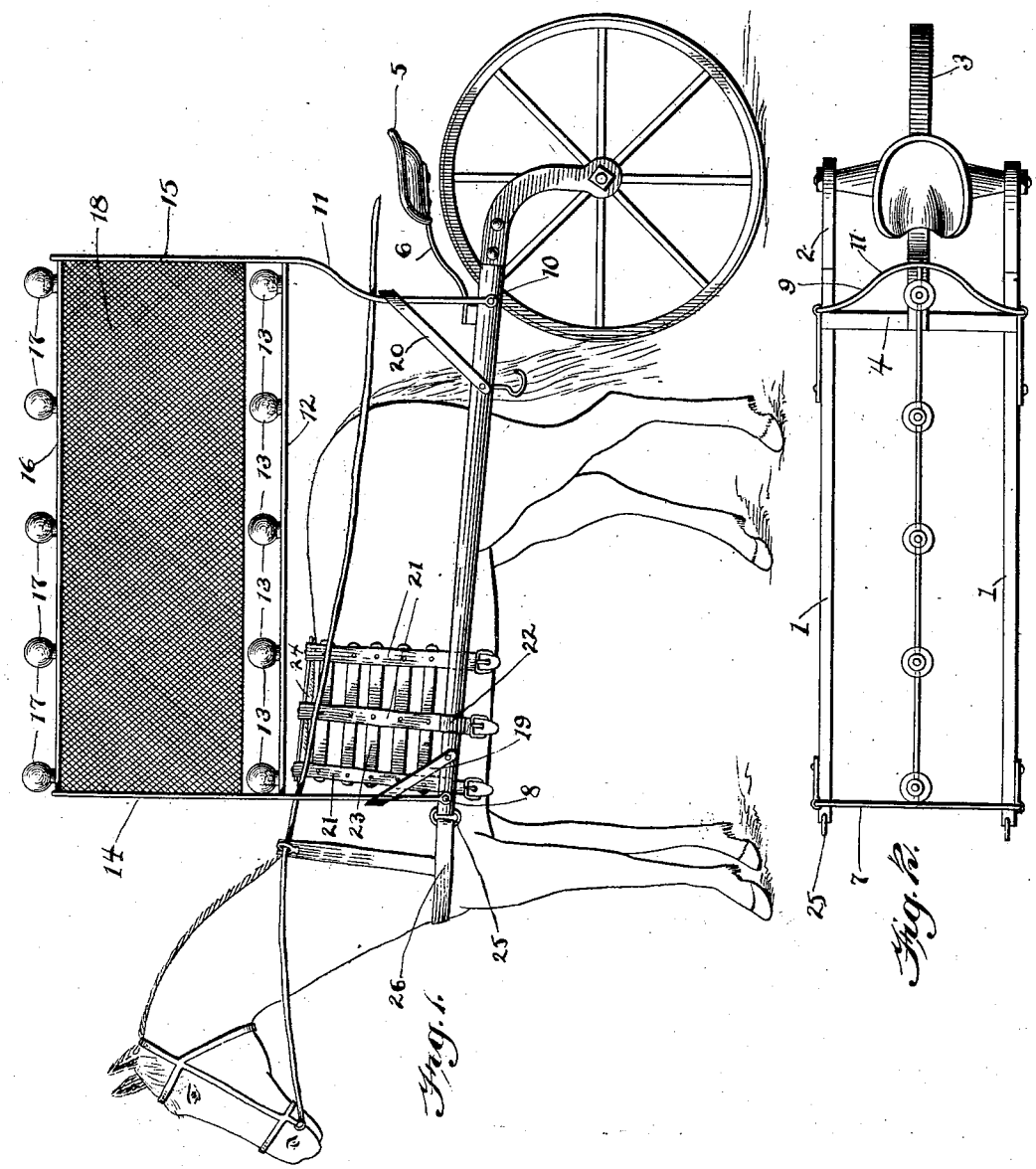
Witnesses
Inventor
Martin B. Gooing
By Knight Bros
Attorneys

UNITED STATES PATENT OFFICE.

MARTIN BIRD GOOING, OF VICKSBURG, MISSISSIPPI.

COMBINED ROAD-CART AND INSECT-CATCHER.

SPECIFICATION forming part of Letters Patent No. 707,965, dated August 26, 1902.

Application filed March 3, 1902. Serial No. 96,483. (No model.)

*To all whom it may concern:*

Be it known that I, MARTIN BIRD GOOING, a citizen of the United States, residing at Vicksburg, in the county of Warren and State of Mississippi, have invented certain new and useful Improvements in a Combined Road-Cart and Insect-Catcher, of which the following is a specification.

Figure 1 is a side elevation of my improved road-cart and insect-catcher. Fig. 2 is a top plan view of the same.

The object of my invention is to construct an insect-catcher that can be passed between the rows of cotton and corn at night; and it consists of a one-wheeled cart above the shafts of which is secured a frame across which is stretched a net coated with a suitable adhesive substance. Suitable lights are secured above and below the net.

1 represents suitable thills, to the ends of which are bolted thill-irons 2.

3 is a wheel the axle of which is journaled in the thill-irons 2, as shown in the drawings.

4 is a cross-bar connecting the shafts, and 5 is a seat secured to the cross-bar 4 by means of the heavy spring 6, said spring and seat being disposed above and over the center of the wheel 3.

7 is an arched bar or frame the ends of which are secured to the forward ends of the thills, as at 8, the arch being of sufficient height to clear the back of the horse attached to the vehicle. 9 is another arched bar secured at 10 near the rear ends of the thills, said bar being given a backward bend near its top, as at 11. The arched bars are connected at the top by means of a brace or support 12, extending lengthwise of the vehicle, upon which are suitably secured suitable lamps 13.

14 and 15 are standards extending upwardly from the center of the arched bars 7 and 9, connected at the top by means of a cross-bar or support 16, upon which are mounted suitable lamps 17.

18 is a net stretched between the standards 14 and 15, to which the ends of the net are secured, while the upper edge of the net is firmly secured to the support or brace 16.

The arched bars 7 and 9 are suitably braced by means of the braces or straps 19 and 20, said straps being connected at their upper ends to the arched bars and at their lower ends to the thills, as clearly shown in the drawings.

The harness-saddle for use in connection with this cart comprises the three straps 21, the center strap only being passed around the shaft of the thill, as shown at 22 in Fig. 1. These straps are connected together by means of spring-metal plates 23, under each of which is secured a suitable pad 24. The forward ends of the thills are provided with closed links 25, in which are secured the ends of the breast-strap 26.

In use this vehicle is driven between the rows of cotton, corn, or other growing plants at night, the lights attracting the various insects. The insects in their attempt to fly about the lights strike against the netting 18 and are trapped by means of the adhesive substance with which this netting is coated.

In the event that it is desired to use the road-cart independently of the insect-catcher it is only necessary to remove the braces 19 and 20 and the bolts holding the arched bars 7 and 9, whereupon said insect device may be removed and leave the cart free for use as a road-vehicle.

Having thus described my invention, what I claim is—

1. The combination with a one-wheeled vehicle, of a net coated with adhesive substance and mounted centrally over the thills of the vehicle and a series of lights arranged around said netting.

2. The combination with a one-wheeled vehicle, of arched bars secured to and extending upwardly from the thills of the vehicle, a net covered with adhesive substance mounted upon said arched bars and a series of lights surrounding said net.

3. The combination with a one-wheeled vehicle, of arched bars secured to and extending above the thills of said vehicle, standards mounted upon and extending upward from the center of the arched bars, a brace connecting the upper ends of said standards, a net coated with adhesive substance and secured to said standards and to said brace.

4. The combination with a one-wheeled vehicle, of arched bars extending upwardly from and secured to the thills of the vehicle, braces secured to said bars and to said thills, a brace connecting the arched bars at the top, standards projecting upwardly from the center of the arched bars, a brace connecting the upper ends of the standards, a net coated with adhesive substance secured to the said standards, and to the brace connecting the upper ends of the standards and a series of lights secured upon the last two named braces.

The foregoing specification signed this 22d day of February, 1902.

MARTIN BIRD GOOING.

In presence of—
 H. K. BARSTOW,
 G. R. MOGUIN.